3,399,002
ELECTROSTATIC SUPPORT SYSTEM
James L. Atkinson, La Mirada, Calif., assignor to North American Rockwell Corporation, a corporation of Delaware
Filed Feb. 16, 1966, Ser. No. 527,840
10 Claims. (Cl. 308—10)

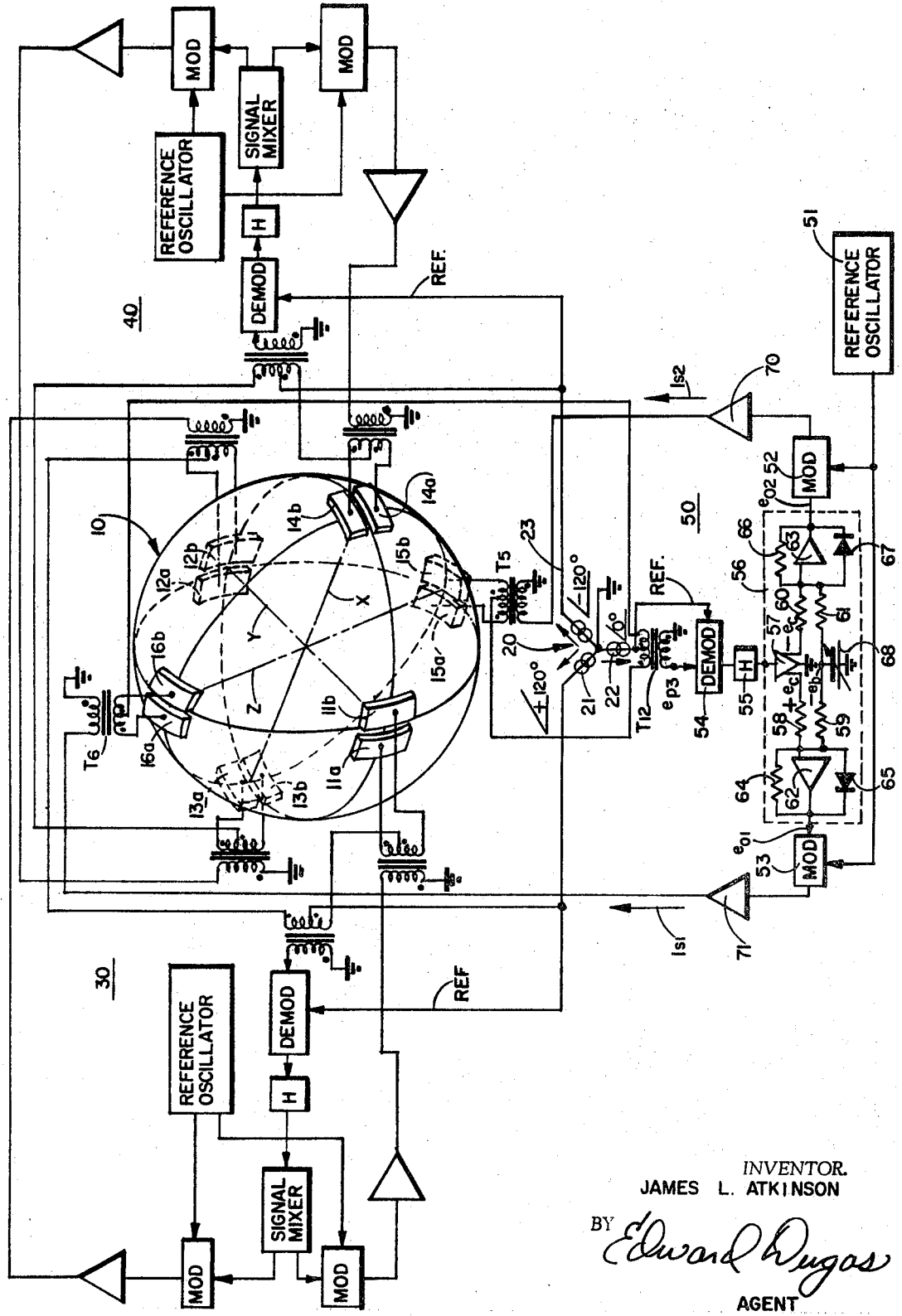

This invention pertains to an electrostatic support system and more particularly to an electrostatic support for the rotor of a gyroscope which provides at least two levels of preload enabling efficient operation of the gyroscope in vehicles which are subjected to a wide range of g-loadings.

The known prior art consists of devices which develop an electrostatic field between all support plates and the rotor simultaneously. Taking the "top" and "bottom" plates as an example, when the rotor is centered (under no external force field), the top and bottom plates are both energized. The forces are tugging against each other with the same magnitude so that the net force on the rotor is zero. All systems are dissipative so that while no work is being done on the rotor, primary power is being consumed. The presence of these "bucking" forces is called preload. The higher the "g-rating" of the gyro, the higher the preload and consequentially the higher the power consumption in low g environment. If the system must withstand the g loading of vehicle boost, and then following this must consume low power in a near-zero g environment, then a linear preloaded levitation control system has a problem. It is also known that preload causes gyro error torques to be developed; this is a serious deficiency for long-cruise systems.

Electrostatic support systems illustrating the single-mode of preloading the rotor of a gyroscope are disclosed in U.S. Patent No. 3,003,356, entitled, "Free-Gyro Systems for Navigation or the Like," by A. T. Nordsieck; U.S. Patent No. 3,098,679, entitled, "Passive Control Circuit for Electrostatic Bearing," by William F. De Boice; U.S. patent application Ser. No. 441,808, filed Mar. 22, 1965, entitled, "Electrostatic Support Circuit," by J. L. Atkinson et al.; U.S. patent application Ser. No. 442,135, filed Mar. 23, 1965, entitled, "Gyroscope," by W. H. Quick.

Generally speaking, in each of the referenced patents or patent applications the gyroscope is a free-rotor type in which spherical-support forces are derived from an electric field. The rotor is an aluminum or beryllium sphere which may be either solid or hollow. The electrostatic support means may consist of six pairs of spherical segment electrodes dispensed about the rotor so as to provide universal or three-degrees of support. Some of the systems provide an A.C. support voltage, others a D.C. support voltage; but all operate upon the principal of preloading the rotor a predetermined amount which is determined by the g-environment in which the gyroscope is to be operated.

The basic concept of this invention is that the amount of force preload is adjustable and that a zero preload system is but a special case. For a given threshold of preload, rotor excursions beyond this threshold put the system in a nonpreload condition, hence the name dual mode. That is, the system is in Mode I when the rotor has some small or zero displacement; the rotor is preloaded and the force is a first or linear function of displacement. In Mode II the displacement is larger than some predetermined value and the preload is removed. The top plate, for example, is energized but not the bottom. In this mode the force is a second or square law function of displacement.

The displacement threshold level between Mode I and Mode II is selected on the basis of (a) tolerable preload (as it affects error torques), (b) desired linear range for readout purposes such as accelerometer readings, (c) control system low level limit cycle behavior, and (d) desired power efficiency for particular environmental forces.

The advantage of this invention over the prior art is the capability of adjusting the extent of the linear, preloaded region, which is defined in terms of rotor displacement. The adjustments are made on the basis of expected force environments and desired usage of the gyroscope. For example, if limit cycling of the rotor levitation control system is objectionable, a small linear region is desirable. If minimum gyro error torques are to be generated, the linear region is set to zero. If position pickoff readings are to be interpreted in terms of applied disturbance force, the linear region should extend beyond maximum expected rotor excursions. If large forces are applied for a short duration followed by long periods of a fractional-g field, primary power consumption will be minimized by reducing the preload to a minimum.

It is therefore an object of this invention to provide an improved electrostatic support system.

It is a further object of this invention to provide an electrostatic support system for maintaining a gyroscope rotor at or near the desired centered condition over a wide range of g-loading.

It is another object of this invention to provide an electrostatic support system which utilizes a minimum amount of power.

It is yet another object of this invention to provide a dual-mode electrostatic support system.

It is still another object of this invention to provide a dual-mode electrostatic support system wherein the threshold between modes may be adjusted.

Further objects of this invention will become more apparent from the following description when taken in conjunction with the accompanying drawing wherein is illustrated the preferred embodiment of this invention.

The drawing illustrates a three-axis support system for an electrostatic gyroscope having a spherical conductive rotor 10 which may be hollow and constructed from some material such as aluminum or beryllium. The sphere 10 is supported along the Z axis by the pairs of electrodes or plates 16a–16b and 15a–15b, along the Y axis by the pairs of electrodes or plates 11a–11b and 12a–12b, and along the X axis by the pairs of electrodes 13a–13b and 14a–14b. Each of the pairs of electrodes, plates are symmetrically placed with respect to their respective axis and have their inner surfaces concave and concentric with the center of rotor 10. The axes X, Y and Z are mutually perpendicular to each other. The plates 11a through 16b have their inner surfaces defining a sphere which is slightly larger than the spherical rotor 10.

The pairs of plates 11a–11b and 12a–12b are electrically connected to the support circuit 30, the pairs of plates 13a–13b and 14a–14b are electrically connected to the support circuit 40, and the pairs of plates 15a–15b and 16a–16b are electrically connected to the support circuit 50. The three-phase current supply 20 (which may be a voltage supply) having for example a frequency of 60 kc./s. is electrically connected so as to provide a different phase of current to each support circuit. The support circuits 30, 40, and 50 are identical in construction and operation and for purposes of simplicity only supporting circuit 50 will be described in detail.

Plates 15a and 15b are electrically connected to the support circuit 50 by transformer T5. Transformer T5 is a balanced transformer having a center-tapped secondary winding and a primary winding, the poling of which is indicated by dots. One end of the secondary winding is connected to plate 15a and the other end is connected to plate 15b. In a balanced type of transformer such as transformer T5, the inductance and resistance of the secondary winding on each side of the center-tap is ideally equal.

The plates 16a and 16b are similarly connected to the transformer T6 which is identical to the transformer T5.

Transformer T12 which is also a balanced transformer having a center-tapped secondary winding, a primary winding and poling in accord with the dot identification has its center-tap connected to one phase indicated by numeral 22 of the three-phase current source 20. One end of the secondary of transformer T12 is connected to the center-tap of transformer T5, the other end of the secondary of transformer T12 is connected to the center-tapped secondary of transformer T6. One end of the primary windings of transformers T5, T6 and T12 are connected to ground. The other end of the primary windings of transformers T5 and T6 are connected to the outputs of current amplifiers 70 and 71, respectively. Current amplifiers having the desired characteristics which may be used with the invention are disclosed in "Computer Handbook," by Harry D. Huskey and Granino A. Korn, First Edition, page 9–46, McGraw-Hill Book Co., Inc., New York, 1962. The other end of the primary winding of transformer T12 is connected to the demodulator 54. Demodulators which may be used to fill the function of block 54 are disclosed in "Control Systems Engineering," by C. V. Savant, First Edition, page 305, McGraw-Hill Book Co., Inc., New York 1958. On page 306 of this book there is disclosed a modulator which can perform the function of modulators 52 and 53. The phase 22 of current supply 20 is also connected to demodulator 54 so as to provide a reference signal.

The modulators 52 and 53 are connected so as to provide the input signals to amplifiers 70 and 71, respectively.

Reference oscillator 51, having for example a frequency of 20 kc./s., is connected to and provides the reference signals for modulators 52 and 53. A servo compensating network 55 bearing the standard servo art designation H is connected so as to receive the output from demodulator 54 and provide the input to signal mixer 56.

A circuit which can perform the function of compensating network 55 is a lag-lead network such as the type disclosed in "Control System Analysis and Synthesis," by J. J. D'Azzo and C. H. Houpis, First Edition, page 109, McGraw-Hill Book Co., Inc., New York, 1960.

The outputs $e_{o1}$ and $e_{o2}$ of signal mixer 56 is comprised of an amplifier 57 which has as its input the output from compensating network 55. Amplifier 57 has two outputs so as to provide a push-pull output signal. One output from amplifier 57 is connected by resistor 58 to the input of amplifier 62 and the other output is connected by resistor 60 to the input of amplifier 63. A variable potential signal source 68 having its positive terminal connected to ground is connected by resistors 59 and 61 to the input of amplifiers 62 and 63, respectively.

The outputs of amplifiers 62 and 63 are fed back to their respective inputs by resistors 64 and 66. Diodes 65 and 67 are connected from the outputs to the inputs of amplifiers 62 and 63, respectively, and are polarized so as to provide a forward current path from the input to the output of their respective amplifiers when the input of the respective amplifiers is positive with respect to the output. The outputs from amplifier 62 and 63 are connected to the inputs of modulators 53 and 52, respectively.

Theory of operation

The displacement of sphere 10 from a centered position between the pairs of electrodes 15a–15b and 16a–16b causes the signal $e_{p3}$ at the primary of transformer T12 to be a carrier balanced signal which is modulated by the displacement, position, of the sphere 10. The frequency of the carrier signal is the frequency of the constant current source 20.

The modulated signal $e_{p3}$ is fed to the demodulator 54 which also has as an input a reference signal from the current source 20 for purposes of demodulating the signal $e_{p3}$. The output from demodulator 54 is then a D.C. voltage which is proportional to the displacement, position, of the sphere 10. This D.C. signal passes through a conventional compensation network 55, H, which may include an integral network for enhanced D.C. stiffness. The output from the network 55 is designated $e_c$ and is fed to the signal mixer 56 and more particularly to an amplifier 57 which provides a signal $+e_c$ to a first channel when the input $e_c$ is of a positive polarity and a signal $-e_c$ to a second channel. Within the first channel the signal $+e_c$ is combined with the signal $-e_b$ from variable signal source 68 to provide the signal $e_{o1}$ at the output of amplifier 62. Within the second channel the signal $-e_c$ is compared with the signal $-e_b$ to provide a signal $e_{o2}$ at the output of amplifier 63.

The output $e_{o1}$ from channel 1 (amplifier 62) may be described in mathematical form as:

$$e_{o1} = \begin{cases} 0; & e_c \geq e_b \\ (e_b - e_c); & e_c \leq e_b \end{cases}$$

and $$e_{o2} = \begin{cases} (e_b + e_c); & e_c \geq -e_b \\ 0; & e_c \leq -e_b \end{cases}$$

These may be rewritten as $$e_{o1} = \begin{cases} 0; & e_c \geq e_b \\ (e_b - e_c); & -e_b \leq e_c \leq e_b \text{ or } |e_c| \leq e_b \\ (e_b - e_c); & e_c \leq -e_b \end{cases}$$

$$e_{o2} = \begin{cases} (e_b + e_c); & e_c \geq e_b \\ (e_b + e_c); & |e_c| \leq e_b \\ 0; & e_c \leq -e_b \end{cases}$$

Since the net electrostatic force $F_n$ acting on the sphere 10 is proportional to the difference of the squares of the control currents and the control currents are proportional to the outputs of the signal mixers, $$F_n = K(e_{o2}^2 - e_{o1}^2) = K \begin{cases} (e_b + e_c)^2; & e_c \geq e_b \\ 4e_b e_c; & |e_c| \leq e_b \\ -(e_b - e_c)^2; & e_c \leq -e_b \end{cases}$$

The signal mixer outputs $e_{o1}$ and $e_{o2}$ are fed to the modulators 53 and 52, respectively. The modulators balance modulate a carrier signal from reference oscillator 51 at a rate determined by the signals $e_{o1}$ and $e_{o2}$. The output from the modulators 53 and 52 is now fed to current amplifiers 71 and 70, respectively, such that the output from these amplifiers $I_{s1}$ and $I_{s2}$, respectively, are currents which are proportional to the voltages at output of the modulators 53 and 52, respectively. The currents $I_{s1}$ and $I_{s2}$ are applied to the electrode pairs 16a–16b and 15a–15b, respectively, via transformers T6 and T5, respectively, so as to restore the sphere 10 to its centered position between the electrodes.

The signal D.C. position signal $e_c$ is a linear function of the spheres' displacement, position. Therefore, as long as the amplitude of $e_c$ is less than the predetermined level signal $e_b$ the net force $F_n$ will be a linear function of displacement and for amplitudes of $e_c$ above $e_b$, the net force $F_n$ will be a square law function of displacement. In the static case where $e_c$ is zero, the static force on each electrode pair will be $$F16a\text{--}16b = F15a\text{--}15b = K e_b^2$$

When the level of the predetermined signal is adjusted to zero there is only one mode of operation that is the square law mode.

Although the invention has been described and illustrated in detail, it is to be clearly understood that the same is by way of illustration and example only and is not to be taken by way of limitation, the spirit and scope of this invention being limited only by the terms of the appended claims.

I claim:
1. An electrostatic support system for supporting a member between pairs of electrodes comprising in combination:
   electrostatic support means establishing an A.C. potential between said member and said electrodes;
   sensing means providing an A.C. position signal which is modulated as a function of the displacement of said member with respect to said electrodes;
   a demodulator demodulating said position signal providing a D.C. signal having a polarity and amplitude indicative of the displacement of said member with respect to said electrodes; and
   a signal mixer means receiving as an input said D.C. signal and providing to said electrodes a signal that is a first function of displacement when said displacement is below a predetermined value and providing a signal that is a second function of displacement when said displacement is above said predetermined value.

2. The system of claim 1 wherein in said first function is a linear function and said second function is a nonlinear function.

3. The system of claim 1 wherein said predetermined level is a function of the $g$ environment of said supported member.

4. The system of claim 1 wherein said sensing means senses the current flow between said electrodes and said supported member.

5. The system of claim 1 wherein said means responsive to said provided signal is comprised of a reference signal source providing an output signal proportional to said predetermined level, signal mixer means responsive to said sensing means and said reference signal source for providing a signal to said electrostatic support means which is of a first value when the signal from said sensing means is below the value of said reference signal source and which is of a second value when the signal from said sensing means is above the value of said reference signal source.

6. An electrostatic support system for supporting a member between pairs of electrodes comprising in combination:
   electrostatic support means establishing a potential between said member and said electrodes so as to effect support of said sphere between said electrodes;
   sensing means providing a signal indicative of the displacement of said member with respect to said electrodes; and
   means responsive to said provided signal supplying said support means with a signal that is a linear function of the displacement of said member when said displacement is below a predetermined value and supplying a signal that is a non-linear function of displacement when said displacement is above said predetermined level, so as to effect centering of said member between said electrodes.

7. The system of claim 6 wherein said sensing means provides a signal having a polarity and amplitude indicative of the displacement of said member from a centered position between said pairs of electrodes.

8. The system of claim 6 wherein said electrostatic support means provides a signal to one pair of electrodes when the polarity of said sensed signal is of one polarity and a signal to the other pair of electrodes when the polarity of said sensed signal is of an opposite polarity.

9. The system of claim 3 wherein the signal applied to said one pair of electrodes is a function of $e_{o1}$ and the signal applied to said other pair of electrodes is a function of $e_{o2}$ where the values of $e_{o1}$ and $e_{o2}$ are described by the formulas $$e_{o1} = \begin{cases} 0; & e_c \geq e_b \\ (e_b - e_c); & -e_b \leq e_c \leq e_b \text{ or } |e_c| \leq e_b \\ (e_b - e_c); & e_c \leq -e_b \end{cases}$$

$$e_{o2} = \begin{cases} (e_b + e_c); & e_c \geq e_b \\ (e_b + e_c); & |e_c| \leq e_b \\ 0; & e_c \leq -e_b \end{cases}$$

wherein $e_b$ = is a signal indicative of said predetermined level,
$e_c$ = is the signal provided by said sensing means.

10. The system of claim 6 wherein said responsive means is comprised of an amplifier having as an input said provided signal, a first and a second amplifying channel, said amplifier providing an output to said first amplifying channel when said provided signal is of a one-polarity and to said second amplifying channel when said provided signal is of an opposite polarity, a signal source providing a signal indicative of said predetermined level to said first and said second amplifying channels such that said first amplifying channel provides an output when the amplitude of the signal provided to said first amplifying channel is equal to or less than the level of the signal from said signal source and said second amplifying channel provides an output signal when the amplitude of the signal provided to said second amplifying channel is equal to or greater than the negative of the level of the signal from said signal source.

No references cited.

MILTON O. HIRSHFIELD, *Primary Examiner.*

L. L. SMITH, *Assistant Examiner.*